(12) United States Patent
Johansson et al.

(10) Patent No.: US 6,598,308 B1
(45) Date of Patent: Jul. 29, 2003

(54) MEASURING SYSTEM

(75) Inventors: Håkan Johansson, Åtvidaberg (SE); Lars Nilsson, Åtvidaberg (SE)

(73) Assignee: JNE AB (SE)

( * ) Notice: Subject to any disclaimer, the term of this patent is extended or adjusted under 35 U.S.C. 154(b) by 0 days.

(21) Appl. No.: 09/201,112

(22) Filed: Nov. 30, 1998

(30) Foreign Application Priority Data

| Nov. 28, 1997 | (SE) | 9704437 |
|---|---|---|
| Nov. 28, 1997 | (SE) | 9704438 |
| Mar. 4, 1998 | (SE) | 9800674 |
| Mar. 30, 1998 | (SE) | 9801083 |

(51) Int. Cl.$^7$ .............................................. G01D 21/00
(52) U.S. Cl. ...................................................... 33/608
(58) Field of Search ......................... 33/608, 288, 286, 33/600, DIG. 1, DIG. 21, 520, 644, 613, 645

(56) References Cited

U.S. PATENT DOCUMENTS

| 611,625 | A | * | 10/1898 | Goddard | |
| 2,781,582 | A | * | 2/1957 | Worsch | 33/27 |
| 3,068,573 | A | * | 12/1962 | Sidwell | 33/1 |
| 3,512,261 | A | * | 5/1970 | Violett | 33/169 |
| 3,699,659 | A | | 10/1972 | Roeller | |
| 4,015,338 | A | | 4/1977 | Kunze et al. | |
| 4,142,299 | A | * | 3/1979 | Alsina | 33/DIG. 21 |
| 4,294,016 | A | * | 10/1981 | Wilkerson | 33/600 |
| 4,329,784 | A | * | 5/1982 | Bjork | 33/608 |
| RE31,000 | E | * | 7/1982 | LeGrand et al. | 33/180 |
| 4,366,624 | A | * | 1/1983 | Bergstrom | 33/600 |
| 4,407,073 | A | * | 10/1983 | Nilsson et al. | 33/203 |
| 4,432,144 | A | * | 2/1984 | Carlsson | 33/180 |
| 4,442,608 | A | * | 4/1984 | Clausen | 33/288 |
| 4,523,384 | A | * | 6/1985 | Giacomini | 33/608 |
| 4,598,481 | A | * | 7/1986 | Donahue | 33/228 |
| 4,621,435 | A | | 11/1986 | Higginbotham | |
| 4,630,379 | A | * | 12/1986 | Wickmann et al. | 33/288 |
| 4,663,855 | A | * | 5/1987 | Hamilton et al. | 33/DIG. 21 |
| 4,683,663 | A | * | 8/1987 | Sarauer | 33/288 |
| 4,731,936 | A | * | 3/1988 | Aldrich et al. | 33/608 |
| 4,922,623 | A | * | 5/1990 | Aldrich et al. | 33/608 |
| 4,958,439 | A | * | 9/1990 | Dehn | 33/608 |
| 5,207,002 | A | | 5/1993 | Humblett | |
| 5,343,628 | A | * | 9/1994 | Ham | 33/608 |
| 5,507,101 | A | | 4/1996 | Mason | |
| 5,515,613 | A | * | 5/1996 | Hinson | 33/288 |
| 5,522,145 | A | * | 6/1996 | Chisum | 33/288 |
| 5,647,139 | A | | 7/1997 | Richardson | |
| 5,848,477 | A | * | 12/1998 | Wiedmann et al. | 33/503 |
| 6,115,927 | A | * | 9/2000 | Hendrix | 33/288 |
| 6,347,457 | B1 | * | 2/2002 | Espinoza et al. | 33/288 |

* cited by examiner

Primary Examiner—Christopher W. Fulton
Assistant Examiner—Tania C. Courson
(74) Attorney, Agent, or Firm—Hayes Soloway P.C.

(57) ABSTRACT

Device for measuring the bottom of vehicles comprising an extendable rule that in one end is provided with a conical mandrel for contact with measuring holes or points and that the ruler in its other end is provided with a magnetic fastening means and a centering means for centering the fastening means relative to holes in the bottom. The centering means is a conical mandrel that against the force of a spring can be pushed into the fastening bracket.

2 Claims, 5 Drawing Sheets

MEASURING SYSTEM

BACKGROUND OF THE INVENTION

As an aid when checking damages on crashed cars and on repairing these respectively it is known to use rulers constituted by an extendable, for instance telescopic part that is fixable to its length and in its ends are provided with measuring points. The ruler may be used for measuring or adjusted according to measures taken from an undamaged side or alternatively from a data sheet or drawing for the vehicle for comparisons. To this end the ruler is provided with scales. Since most mass produced vehicles are provided with a number of holes in the bottom of the body that are very precisely defined to their position one can with the aid of such a ruler comparatively simply through measuring between selected holes obtain a good measuring accuracy for cross measuring.

A drawback with these rulers is however that they are comparatively cumbersome requiring in particular at larger damages when the ruler becomes comparatively long and consequently difficult to handle and to locate with the required exactness with its points. In reality this often means that its a two person job with the resulting costs.

It is also known to arrange measuring systems on correction, or straightening benches that are used when repairing cars. These measuring systems and correction benches or fixtures are however very expensive and can only be acquired by firms with a sufficiently large volume of work and each bench can only take one car at a time. This means that many who actually would have to use measuring equipment can not afford it, but instead have to work instinctively.

Yet another time when a simple measuring is desirable is when a car has been damaged. A good knowledge of how badly damaged the car is, is necessary in order to enable the insurance company, the owner or the man who is to repair it if the car is worth repairing or if it should be broken up and to assess expected repair time and cost. Even here a simple measuring method with accompanying means would be desirable, provided that sufficient exactness can be achieved. To achieve the desired precision three-dimensional measuring is further desirable.

In view of the above problems the invention has as its object to provide a low-cost simply manageable measuring system for the measuring of the bottom plates of cars.

SUMMARY OF THE INVENTION

The system in accordance with the invention constitute in its most simple variety an extendable ruler or bar that in one end is provided with a measuring point and in the other end with a fastening means including a powerful magnet for the fixing to the underside of the vehicle and a centering device for the centering of the fastening means in relation to a measuring hole in the body. Since today very powerful magnets are available the end of the ruler may be firmly and securely be held to the body even if rust and/or underseal should be present around the hole.

When the ruler is fixed in one end the user may measure distances, compare left and right measures or compare with data sheets. The ruler is mounted in the magnetic fastening bracket and is preferably swivable laterally as well as vertically. In this way it can easily be moved to different measuring points or out of the ay without having to be dismounted. The ruler may easily be used by one person and even on cars that stand on their own wheels. The ruler can be extended to approximately the right distance, inserted under the car and with a simple movement be fastened to the car with the magnet and then the measurements can be controlled in the other end of the ruler or compared with a new reading with the magnet fastened to a symmetric location on the other side.

The centering device for the fastening bracket can be constituted of a cone pretensioned outwards by a spring. At mounting the cone is inserted into the hole and the fastening means is pressed against the hole until the magnet grips. Practically it has turned out that this fastening means result in a good grip that is also always centered in the hole. This also means that the fastening means is adaptable to different hole sizes and the invented fastening means can be used on a very great variety of cars without change of adaptors. With an easy bending movement the fastening means can be removed again. With the right relation between the cone angle, the spring force and the magnetic force, the spring of the cone can center the fastening means during the movement towards the mounted position or actually even after mounting since the force necessary to achieve lateral movement always is smaller than the holding force (since the friction coefficient is always smaller than 1). Even if this balance is not achieved it is easy to feel when the cone has reached its correct position, since the bracket will have a considerably increased resistance against movement away from this position.

The magnetic fastening means in the end of the ruler may be permanently fastened to this or preferably removably. Also for the connection to the ruler magnetic force can be used or a simple snap lock with a spring loaded ball and a circular groove.

The fastening means can according to the invention not only be used together with a ruler but may also be used to mount and center other measuring equipment increasing speed and precision when using these. For instance the rod in the small end of the ruler may in its upper end also be provided with a magnetic self-centering fastening means so that a specific length measure can be monitored while for instance straightening work is carried out.

In accordance with the system according to the invention the ruler may instead of being used together with the magnetic fastening bracket be used together with a transverse preferably self-centering beam that is fastened to the vehicle. By fastening the ruler to a central point on the beam measurements to different points on the right and left side can quickly be taken showing in figures how skewed or deformed the bottom is. The ruler may also be fastenable to points on the transverse beam situation on equal distance from the center to provide additional triangular measurements to provide the coordinates of measuring points.

A further part of the invented system is a device that delivers a line of light and that can be mounted either on the self-centering beam (preferably centered) or on a magnetic fastening bracket. When mounted on the self-centering beam the line automatically will provide a plane that is essentially horizontal or at least perpendicular to the vertical symmetry plane of the car. This means that it can be used as a reference for vertical measurements at least at symmetrical points, for instance by means of an adjustable measuring rod arranged in the outer end of the ruler and provided with a scale. To obtain exact measurements the rod has to be vertical but in order to compare the left and right side it is only necessary to compare readings without adjustments of the rod in the ruler, which in turn means very rapid comparing.

Instead of mound the light (laser) device giving the line on the transverse beam it can be mounted on a magnetic fastening bracket and adjusted so that it is perpendicular to the vertical symmetry plane.

In a more sophisticated development of the invented system using for instance the transverse beam the angles of the ruler laterally and vertically are electronically registered as well as the length of the ruler. In this way a connected computer may provide quickly and precisely a measuring chart of the vehicle, that can be compared with a corresponding data chart of what the measurements should have been. Also this version can to a certain extent be used with the car standing on its wheels. Connection to the computer may be wireless. This version of the invention has the advantage of requiring very little or perhaps no adjustment or precision on mounting since the computer from three undamaged points can relate the measuring to the actual datum plane of the vehicle.

It deserves to be mentioned that the invented system and its components allow not only simple and fast measuring, but it is also easy to understand how it should be used and no lengthy training or tutoring is necessary.

DESCRIPTION OF THE DRAWINGS

Further advantages and characteristics of the invention are apparent from the claims and the following description of preferred embodiments. In the drawings

DETAILED DESCRIPTION OF PREFERRED EMBODIMENTS

Figure 1:
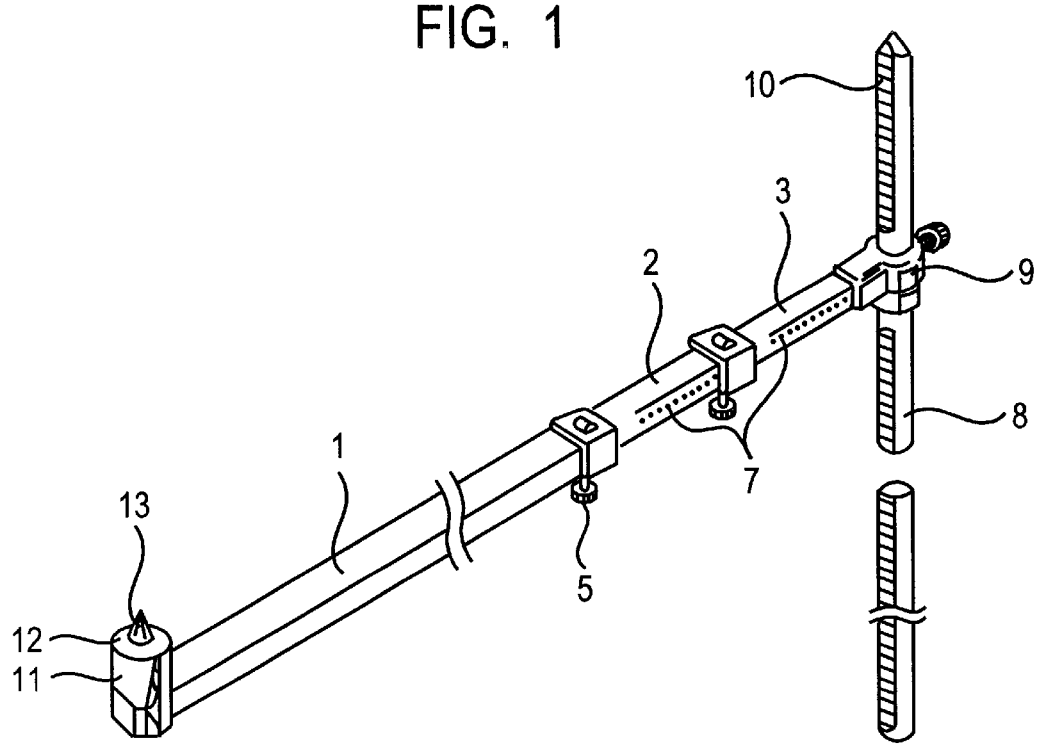
FIG. 1 shows a ruler according to the invention, FIG. 2 an enlarged part of this and FIGS. 3–5, 5A and 6 different views of a 3D-embodiment of the invention.

The ruler shown in FIG. 1 is constituted of three telescoping parts. In the connection between the first part 1 with the largest cross measure and the intermediate part 2 a ball snap means and a locking screw 5 are arranged so t the relative positions easily can be found and locked for instance at each decimeter or half meter. The part with the smallest cross section 3 is steplessly adjustable in the intermediate part and fixable to its extent by means of a lock screw. Measuring scales 7 are arranged on sides of the ruler to allow among other things simple reading from the side when the ruler is used on a car standing on its wheels.

At the distal end of the smallest cross section of the ruler a measuring rod 8 with a conical tip is arranged adjustable perpendicular in relation to the ruler in a lockable guide 9 and is provided with a scale 10.

At the distal end of the largest cross section of the ruler a magnetic fastening means 11 is arranged. The magnetic fastening means is lined up in the same plane as the ruler and the rod at the other end of the ruler. The magnetic fastening means includes a powerful magnet 12 surrounding a conical mandrel 13 that is movable inside the magnet and pretensioned out from the magnet.

Figure 2:
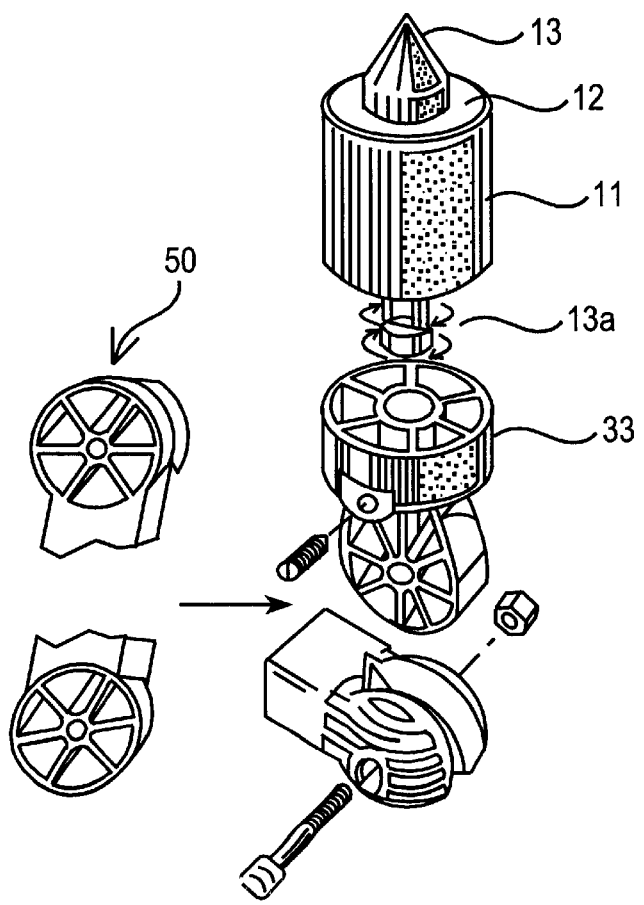
Figure 3:
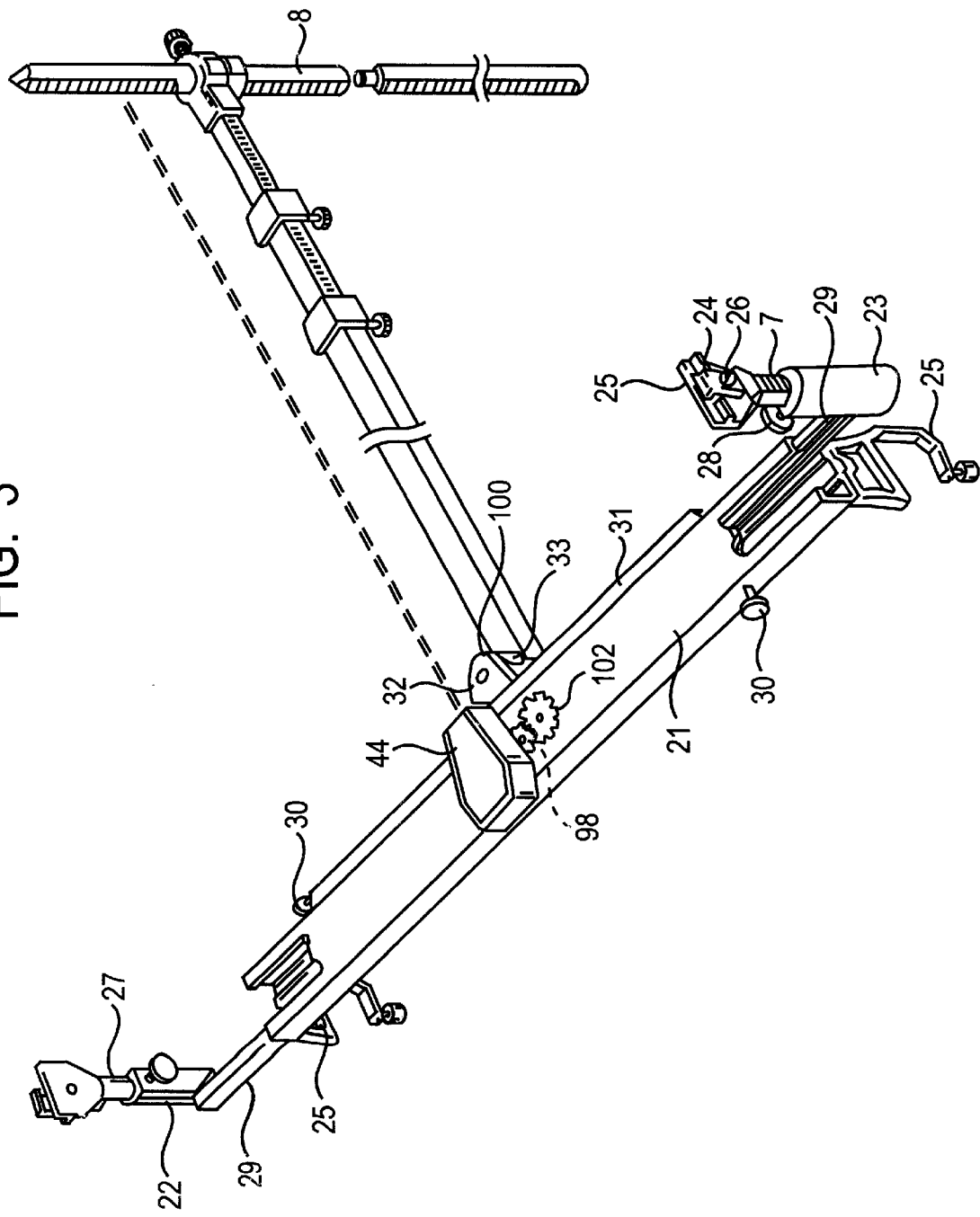
Figure 4:
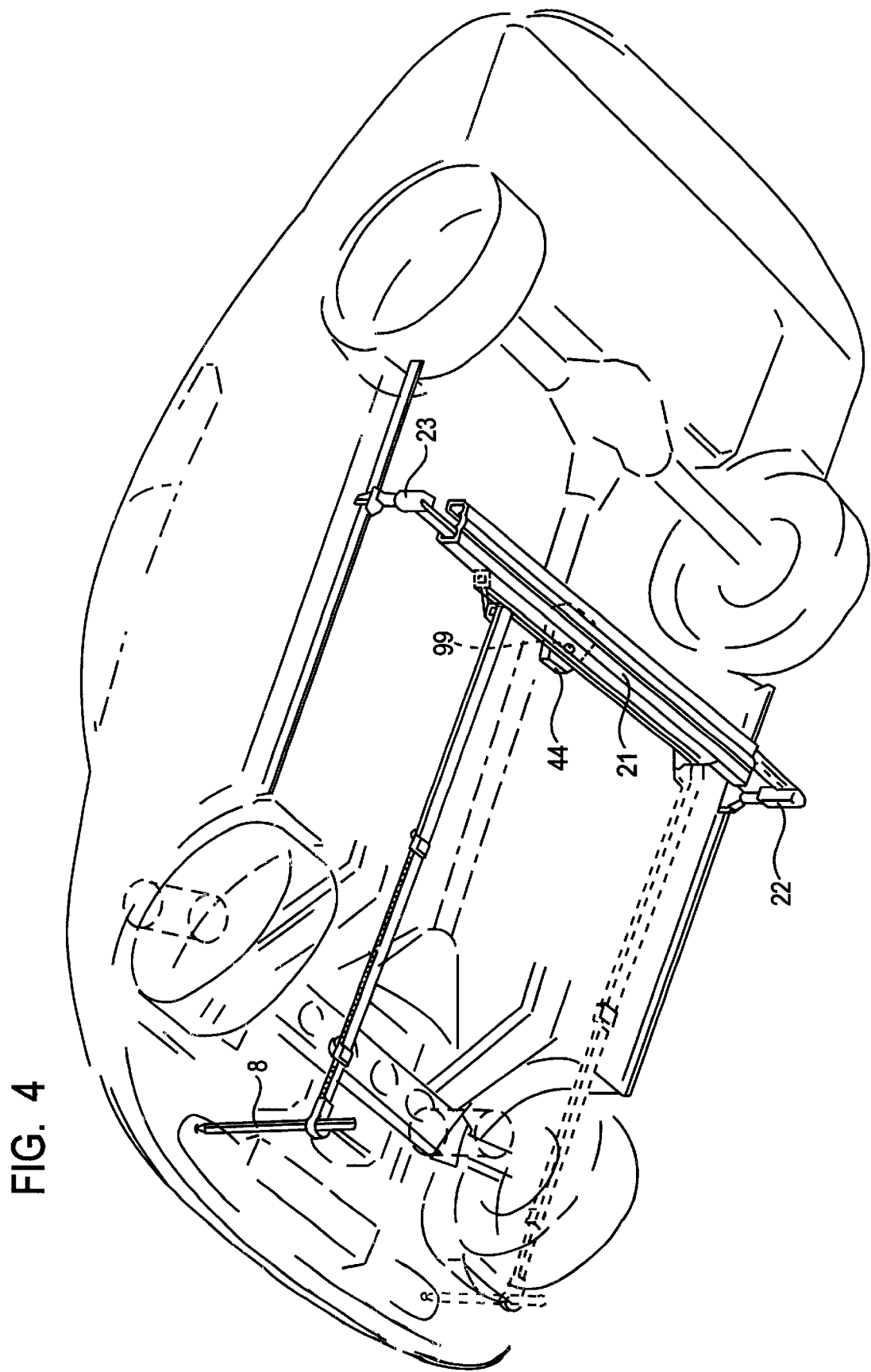
Figures 5, 5A:
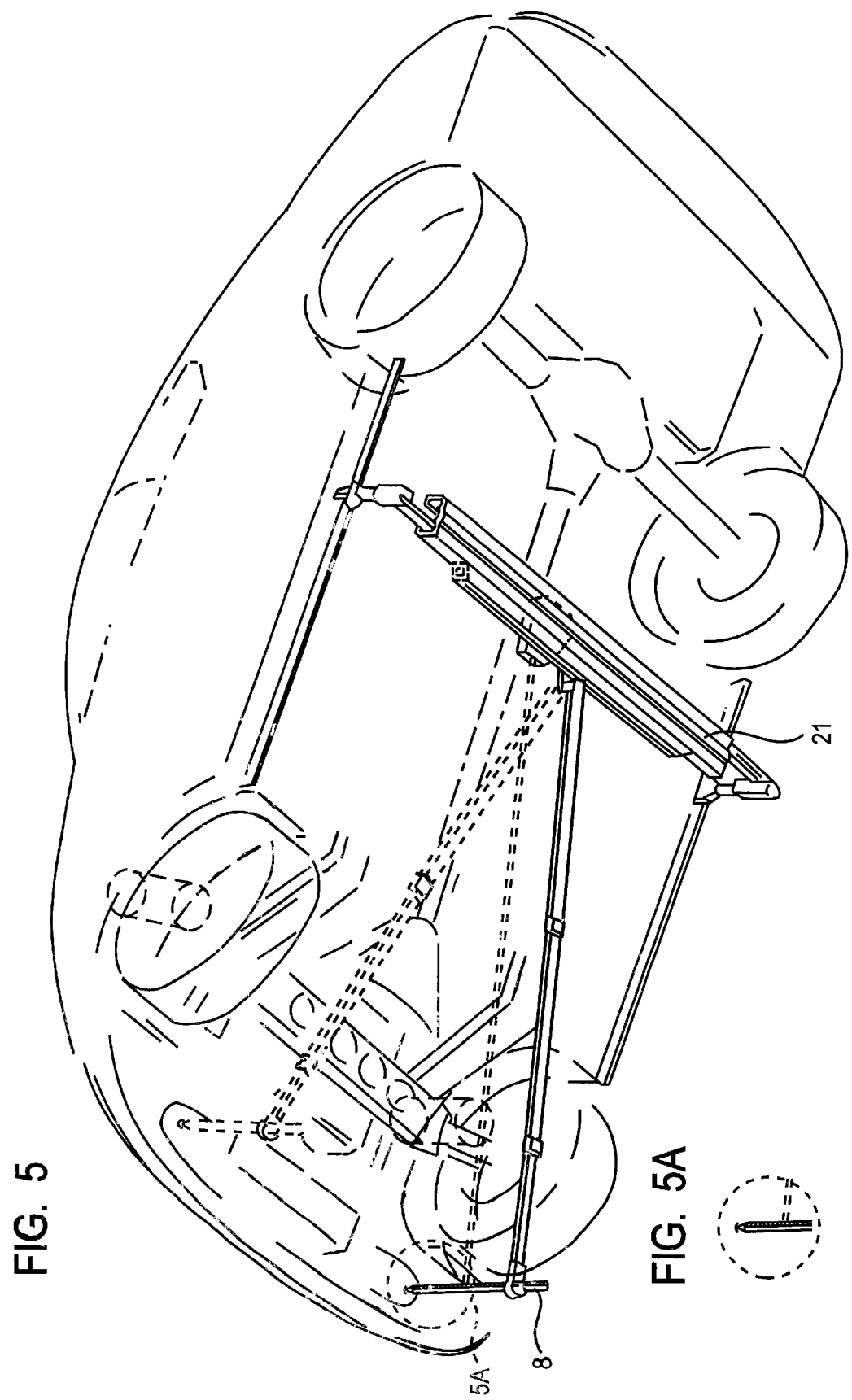
Figure 6:
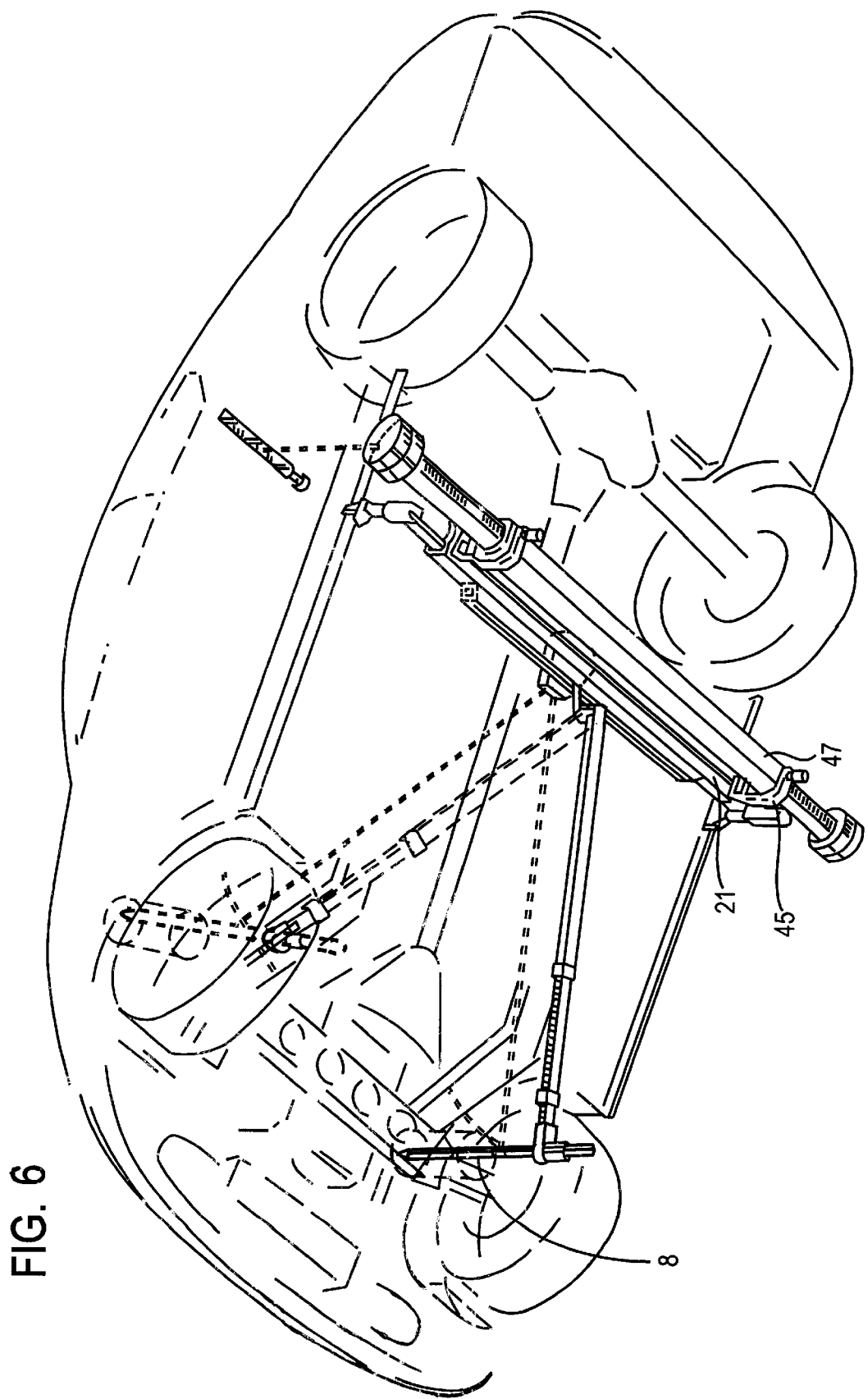

The ruler has the magnetic fastening means 11 at one end and the rod 8 at its other end (FIG. 2). This enables simple measuring of the distance to different points or checking if these are in the right position during for instance straightening work, since with mounted fastening means the ruler can be lowered, moved laterally or not and once again be brought in contact with a measuring point on the vehicle.

As an alternative to arranging a magnet around the centering mandrel, the centering mandrel itself may constitute a powerful magnet with the surrounding guide instead being spring 13a pretensioned towards the tip of the mandrel to secure perpendicularity between the mounting means and the surface on which it is placed.

The fastening means may be extendable by the insertion of an optional extension piece 50 (see FIG. 2) between the ruler and the magnet part for the cases when measuring for instance must take place past a low rear axle, muffler etc. The separability may also be practical if different fastening adapters are necessary, for instance adapted to the mounting points for lifting jacks for some cars. The different parts of the fastening bracket may be held together with magnetic force from the holding magnet or from separate magnets or by snaplocks.

In a second embodiment the invented measuring device shown in FIGS. 3–5, 5A and 6 includes in addition to the above described ruler a beam 21 that can be mounted transversely on a vehicle. In both ends of the beam that is constituted by an extruded aluminum profile extendable brackets 22 and 23 are arranged for mounting on the bottom of a car, for instance on the bottom flange of the thresholds. The brackets comprise simple clamping devices with a loose part 24 and a fixed part 25 that are clampable by means of a bolt 26. The clamping devices are fastened to rods 27 that are arranged in vertical holes on the extendable brackets 22 and 23 and fixable by means of locking screws 28. Furthermore they are provided with scales so that different support levels for the beam 21 can be adjusted dependant on the underside contour of the car, but with the same measure on both sides, that is with symmetric mounting. The extendable brackets 22 and 23 continue in their inner ends in toothed racks 29, that are arranged opposing and overlapping each other inside the profile with a sprocket between them and gripping into both racks 29, and journaled in the beam. This results in the extensions both being extended the same amount so that the beam always will be centered in relation to the car. On both sides locking screws 30 are threaded in the beam to fix the extended positions of the brackets.

On one side of the beam a U-shaped profile 31 with folded edges is arranged with its opening turned away from the beam. In this U-shaped guide a bracket 32 is displaceable transversely along the beam. Exactly in the center position between the brackets there is a little hole (shown in FIG. 4 in phantom at 99) in the lower side of the profile and here a spring loaded ball arranged in the displaceable bracket 32 can snap in exactly when the centered position has been achieved. Two or more such snap positions are arranged in the shape of drilled holes symmetrically on each side of the centered hole to provide additional measuring positions with defined locations. In the bracket 32 a downwards extending short pin (100) is arranged and on this a pivot part 33 (see also FIG. 2) can be pushed on from below pivotable around the pin. The pivot bearing is retained on the pin by means of a ball snap lock and the pivot bearing is fastened to a ruler of the same type as in the first described embodiment.

Measuring is carried out essentially as in the first embodiment but now with the ruler fixed to the self centering beam and located in the centered or in the symmetrical positions.

To complete the above principally two-dimensional measuring to a three-dimensional measuring a laser device 44 can be mounted on the bolt (shown in phantom at 102) of the centrally placed sprocket 98 between the racks. The laser device is held in place by a powerful magnet (attracting the bolt).

The laser device includes also a switch and a battery. In front of the laser a cylinder lens (with vertical axis) is arranged so that an essentially horizontal light line or plane is obtained.

Before measuring commences the light plane may be adjusted to parallelity with the floor or the datum plane of the car by checking the readings with known and undamaged points and by adjusting the fastening of the beam to the car.

The laser device 44 is directed so that the the laser line falls on the rod 8 in the small end of the ruler. When comparing readings from symmetric points on the left and right side it is immediately obvious if the same height readings are obtained. If not the car is skew. By providing the ruler with an extra marker on which the light may fall it is possible get the ruler parallel with the datum plane of the car. Alternatively the ruler may be provided with a scale.

As is apparent from the above the invented device is simple to use and easy to understand and use, in a few minutes it is possible to see in absolute figures how and how much a car is damaged. This means that someone else than the one looking at the car and measuring it can take the decision on scraping or repairing. The figures can be compared with previously repaired cars and their repair costs resulting in an improved decision basis and or cost prediction. If a sufficiently large number of figures are obtained not only is the decision made easier but it also becomes more difficult to tamper with the figures for instance in order to salt the invoice.

If it is desirable to monitor for instance the straightening of a car with hydraulic means an all electronic 3D-version can be used to continuously monitor the work by using a magnetic fastening means in the outer end of the ruler too.

It further deserves to be mentioned that the self-centering beam also can be used together with the symmetry measuring device 47 for body panels that is described in the European patent application 95850071.2 (the disclosure of which is incorporated herein by reference), this device being held in brackets 45.

What is claimed is:

1. Ruler for measuring vehicles, wherein one end of the ruler is provided with a rod with a conical end for contact with measuring holes and points on the vehicle being measured and the ruler at its other end is provided with a magnetic fastener surrounding a spring-loaded mandrel which is movable within the confines of the magnetic fastener for fastening the ruler in a hole in the bottom of the vehicle being measured, and further comprising an expandable beam transversely mountable on a vehicle, the magnetic fastener swivelly coupleable to the beam.

2. Ruler according to claim 1, further comprising a laser device coupled to the beam for providing a horizontal plane falling on the rod in the other end of the ruler.

\* \* \* \* \*